(12) United States Patent
Fultz et al.

(10) Patent No.: US 8,117,493 B1
(45) Date of Patent: Feb. 14, 2012

(54) FAST RECOVERY IN DATA MIRRORING TECHNIQUES

(75) Inventors: Jeffrey Fultz, El Dorado Hills, CA (US); Boris Teterin, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 114 days.

(21) Appl. No.: 12/609,751

(22) Filed: Oct. 30, 2009

(51) Int. Cl.
*G06F 11/00* (2006.01)
(52) U.S. Cl. .................. 714/6.23; 714/6.3; 714/6.32
(58) Field of Classification Search .............. None
See application file for complete search history.

(56) References Cited

U.S. PATENT DOCUMENTS

| | | | | |
|---|---|---|---|---|
| 7,143,307 B1 * | 11/2006 | Witte et al. | ............... | 714/6.23 |
| 2004/0205382 A1 * | 10/2004 | Noda et al. | ............... | 714/6 |
| 2005/0149683 A1 * | 7/2005 | Chong et al. | ............... | 711/162 |
| 2005/0149688 A1 * | 7/2005 | Kitamura et al. | ............. | 711/170 |

OTHER PUBLICATIONS

Osuna, et al., "IBM System Storage N Series SnapMirror", Jul. 2006, First Edition, ibm.com/redbooks.
"IBM System Storage N Series with SnapMirror Software", 2009, ibm.com/systems/storage/nas.

* cited by examiner

*Primary Examiner* — Michael Maskulinski
(74) *Attorney, Agent, or Firm* — Cooper Legal Group, LLC (57) ABSTRACT

One or more data mirroring techniques are provided in which data storage units are pre-connected to a host node in a clustered network, in preparation for a potential data access failure. One or more data storage units are mirrored (e.g., replicated) between a source volume and a destination volume. A destination host node is pre-connected to the one or more mirrored data storage units in a destination volume prior to a data access failure at the source volume. After a data access failure occurs at the source volume (e.g., due to a hardware failure) access to the mirrored one or more data storage units is granted in an efficient manner due to the pre-connection of the destination node to the one or more mirrored data storage units.

20 Claims, 6 Drawing Sheets

FAST RECOVERY IN DATA MIRRORING TECHNIQUES

BACKGROUND

In our modern communication age, commercial enterprises, consumers, and other entities are storing an ever increasing amount of digitized data. For example, many commercial entities are in the process of digitizing their business records and/or other data. Similarly, web based service providers generally engage in transactions that are primarily digital in nature. Thus, techniques and mechanisms that facilitate efficient and cost effective storage of vast amounts of digital data are being implemented.

In some modern data storage systems, data is formatted or organized as a file so that it can be stored within file systems and/or volumes. Since the data is digital or "digitized" (e.g., stored as bits of either 0 or 1), one or more (backup) copies of the data can be made relatively easily. When a copy of a data file is made (e.g., where the data is mirrored or replicated), the original file is at times referred to as the parent or source while the copy may be referred to as the child or destination, where the child is a lossless (e.g., bit for bit) snapshot or "mirror" of the source data taken at a particular point in time. Similarly, in such a scenario, the original file may be regarded as residing on or being stored within a parent or source volume while the copy may be regarded as residing on or being stored within a child or destination volume, where a volume generally corresponds to an amount of memory allocated for storing the data file.

It can be appreciated that in some situations it may be advantageous and/or otherwise desirable to maintain a copy of the data as it appeared at some point in time (e.g., as depicted in the source volume), while also being able to perform testing and/or other operations upon the data as it appeared at that same point in time (e.g., as depicted in a destination volume), where such testing or other operations may occur at the same and/or one or more later points in time, but do not affect the original or parent data. To facilitate availability of such data in the event of hardware, software, or even site failures (e.g., power outages, sabotage, natural disasters, etc.), entities have developed clustered networks that carry out mirroring techniques for data. These mirroring techniques can be a key component in data protection strategies for business entities.

In one example of a mirroring technique, data on a source volume is copied or "mirrored" between a source volume and one or more destination volumes, thereby creating a mirror of the data between the volumes. In this example, if there is a data access failure (e.g., data is inaccessible due to data loss, or some hardware/software failure) at the source volume, the data can be retrieved from the destination volume, and vice versa.

More particularly, for example, a clustered network, such as may be used by an enterprise for data storage and management, may comprise a source storage system located remotely from a destination storage system (e.g., the source systems is in Los Angeles and the destination system is located in New York). In this example, a client (e.g., which may be located anywhere), attached by a network to the cluster can store and retrieve data from the source volume (e.g., through a host, such as a server, in the source storage system). The source storage system can provide for data in the source volume to be replicated (mirrored) on the destination volume, which resides remotely from the source storage system. Periodically, the data on the destination volume can be updated to reflect the data on the source volume, such that the source volume and destination volume store the same data (e.g., mirrored data), albeit at different locations.

Further, in this example, if a natural disaster occurs (e.g., an earthquake in Los Angeles) that causes a hardware failure at the source storage system (e.g., power loss), a data access failure can occur at the source volume. The client can subsequently request access to the destination volume through a host in the destination storage system (e.g., in New York). Because the destination volume stores the same data as the source volume, the client can reliably retrieve the mirrored data even though access to the source volume has failed.

However, retrieving data from such destination volumes after a failure can take an inordinately long time, thereby undesirably tying-up computing resources. In particular, the time is partly due to the fact that, at the time of failure, the host in the destination storage system is not yet connected to the destination volume, or some subset of the data storage volume. Rather, the destination volume is only connected to the host in the source storage system, from which the data mirroring is initiated. Consequently, when a client learns of a failure and requests access to a destination volume through a host in the destination storage system, the client must wait for the destination host to connect to the destination volume (e.g., one or more logical unit numbers (LUNs) in the destination volume) before the client's desired data can be retrieved in full.

Consequently, when recovery includes a large number of destination volumes (or a single destination volume with a large number of LUNs), data retrieval can take an inordinately long time. Access to information is often time critical for commercial enterprises, and computing resources may be limited or impacted by such a delay. It would be desirable to improve the speed at which data can be recovered from one or more mirrored (destination) volumes.

SUMMARY

This disclosure provides for one or more data mirroring systems and/or techniques in which data storage units are pre-connected to a host node in a clustered network, in preparation for a potential data access failure. In one embodiment, data storage units (e.g., logical unit numbers (LUNs) representing blocks of one or more virtual volumes) are mirrored (e.g., replicated) between a source and destination volume, such as may reside on data storage devices in respective data storage systems connected in a clustered network. In this embodiment, in order to mitigate a time between a data access failure, such as on the source volume, and a client being able to retrieve the inaccessible data, such as from the destination volume (e.g., to which the data was mirrored from the source volume), a signal (e.g., command) is transmitted to a destination host causing the destination host to connect to the mirrored data storage units on the destination volume prior to a failure of the source volume (e.g., setting up a "pre-connection" with the mirrored LUNs). Thus, in the event of a data access failure, access is provided (e.g., to one or more host nodes in the clustered network) to the "pre-connected" data storage units (e.g., by bringing them online to the cluster), thereby mitigating a need for one or more host nodes to have to connect to the respective mirrored data storage units individually after the failure. In this way, for example, a time for accessing the data is mitigated, thereby freeing up computing resources.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Some examples of the claimed subject matter are now described with reference to the drawings, where like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. Nothing in this detailed description is admitted as prior art.

Figure 1:
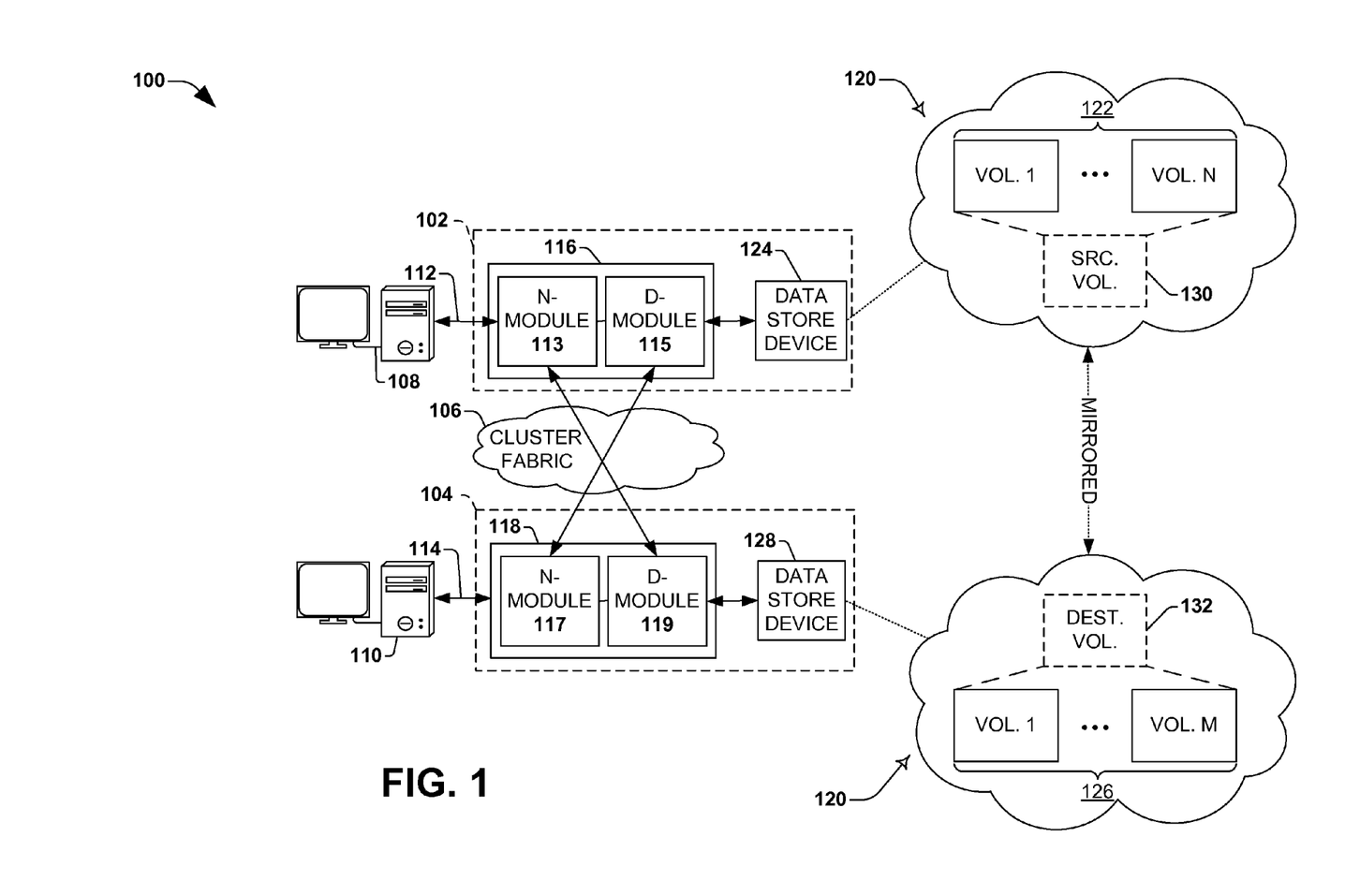
FIG. 1 is a component block diagram of an example embodiment of a clustered network in accordance with one or more aspects of this disclosure.
Figure 2:
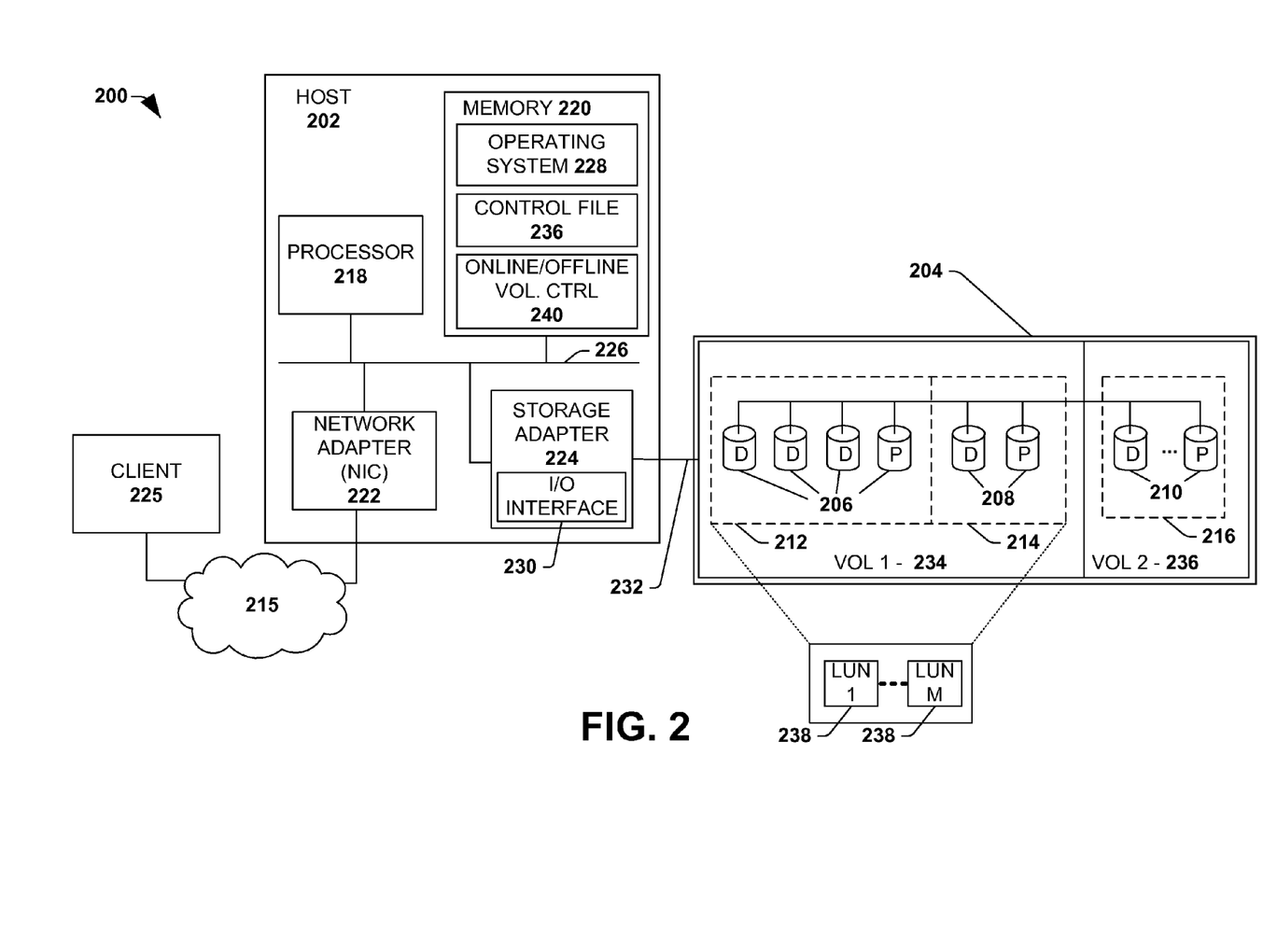
FIG. 2 is component block diagram of an example data storage system in accordance with one or more aspects of this disclosure.

While some current data storage systems provide for mirroring of data within a clustered network, retrieval of the mirrored data upon a triggering event can be cumbersome, resource intensive and time consuming. To provide for efficient resource utilization and improved data recovery time, the present disclosure presents data storage volume mirroring that provides a "pre-connection" status for mirrored volumes, thereby mitigating connection time and resource usage during data retrieval. To provide a context for an embodiment of how mirrored volumes may be implemented, FIG. 1 illustrates a clustered network environment 100 and FIG. 2 illustrates an embodiment of a data storage system that may be implemented to store and manage data in this clustered network environment, utilizing one or more of the techniques and/or systems disclosed herein. It will be appreciated that where the same or similar components, elements, features, items, modules, etc. are illustrated in later Figs. but were previously discussed with regard to prior Figs., that a similar (e.g., redundant) discussion of the same may be omitted when describing the subsequent Figs. (e.g., for purposes of simplicity and ease of understanding).

Turning now to FIG. 1, which is a block diagram illustrating an example clustered network environment 100 that may implement some embodiments of the techniques and/or systems described herein. As an illustrative embodiment, the example environment 100 comprises a source data storage system 102 (e.g., providing a source of data to be mirrored) and a destination data storage system 104 (e.g., providing a destination for the mirrored data to be stored) that are coupled over a cluster fabric 106, such as a computing network embodied as an Ethernet or Fibre Channel (FC) network facilitating communication between the storage systems 102 and 104 (and one or more modules, component, etc. therein, such as nodes 116, 118, for example). Further, the source data storage system 102 and destination data storage system 104 can be located remotely from each other (e.g., the source located in Los Angeles and the destination in New York);

It will be appreciated that clustered networks are not limited to any particular geographic areas and can be clustered locally and/or remotely. It should also be appreciated that a data storage system, as the phrase is used herein, may also comprise a single node (e.g., only 116) rather than a plurality of nodes 116, 118, etc. Similarly, it will be appreciated that a different number of any of the different components, modules, elements, features, items, etc. illustrated in FIG. 1 (and the other accompanying Figs.) is contemplated. That is, the environment 100 illustrated in FIG. 1 and the number of items, components, modules, elements, features, etc. illustrated therein (as well as in other Figs.) is not intended to be interpreted in a limiting manner.

Thus, in one embodiment a clustered network can be distributed over a plurality of storage systems and/or nodes located in a plurality of geographic locations; while in another embodiment a clustered network can include a source data storage system (e.g., 102) and destination data storage system (e.g., 104) (e.g., and/or one or more other data storage systems) residing in a same geographic location (e.g., in a single onsite rack of data storage devices).

In the illustrated example, one or more clients 108, 110, which may comprise, for example, personal computers (PCs), computing devices used for storage (e.g., storage servers), and other computers or peripheral devices (e.g., printers), are coupled to the respective data storage systems 102, 104 by network connections 112, 114. Network connection may comprise a local area network (LAN) or wide area network (WAN), for example, that utilizes Network Attached Storage (NAS) protocols, for example, such as a Common Internet File System (CIFS) protocol or a Network File System (NFS) protocol to exchange data packets. Illustratively, the clients 108, 110 may be general-purpose computers running applications, and may interact with the data storage systems 102, 104 using a client/server model for exchange of information. That is, the client may request data from the data storage system, and the data storage system may return results of the request to the client via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

As illustrated in the exemplary environment 100, nodes 116, 118 can comprise various functional components that coordinate to provide distributed storage architecture for the cluster. For example, the nodes can comprise a network module 113, 117 (e.g., N-Module) and a data module 115, 119 (e.g., D-Module). Network modules 113, 117 can be configured to allow the nodes 116, 118 to connect with clients 108, 110 over the network connections 112, 114, for example, allowing the clients 108, 110 to access data stored in the distributed storage system. Further, the network modules 113, 117 can provide connections with one or more other components through the cluster fabric 106. For example, in FIG. 1, a first network module 113 of a first node 116 can access a second data storage device 128 by sending a request through a second data module 119 of a second node 118.

Data modules 115, 119 can be configured to connect one or more data storage devices 124, 128, such as disks or arrays of disks, flash memory, or some other form of data storage to the nodes 116, 118, for example. The nodes 116, 118 can be interconnected by the cluster fabric 106, for example, allowing respective nodes in the cluster access to data on data storage devices connected to different nodes in the cluster. Often, data modules 115, 119 communicate with the data storage devices 124, 128 according to a storage area network (SAN) protocol, such as Small Computer System Interface (SCSI) or Fiber Channel Protocol (FCP), for example. Thus, as seen from an operating system on a node 116, 118, etc., for example, the data storage devices 124, 128, etc. can appear as locally attached to the operating system. In this manner, different nodes 116, 118, etc. may access data blocks through the operating system, rather than expressly requesting abstract files.

It should be appreciated that, while the example embodiment 100 illustrates an equal number of N and D modules, other embodiments may comprise a differing number of these modules. For example, there may be a plurality of N and/or D modules interconnected in a cluster that does not have a one-to-one correspondence between the N and D modules. That is, different nodes can have a different number of N and D modules, and the same node can have a different number of N modules than D modules.

Further, a client 108, 110 can be networked with the nodes 116, 118 in the cluster, over the networking connections 112, 114. As an example, respective clients 108, 110 that are networked to a cluster may request services (e.g., exchanging of information in the form of data packets) of a node 116, 118 in the cluster, and the node 116, 118 can return results of the requested services to the clients 108, 110. In one embodiment, the clients 108, 110 can exchange information with the network modules 113, 117 residing in the nodes (e.g., network hosts) 116, 118 in the data storage systems 102, 104.

In one embodiment, the data storage devices 124, 128 comprise volumes 122, 126, which is an implementation of storage of information onto disk drives or disk arrays as a file-system 120 for data, for example. In the illustrated example, the volumes 122, 126 comprise among other things source 130 and destination 132 volumes, which are discussed in below with regard to mirroring data. Volumes can span a portion of a disk, a cluster of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the clients 108, 110 can utilize the data storage systems 102, 104 to store and retrieve data from the volumes 120. In this embodiment, for example, the client 108 can send data packets to the n-module 113 in the host node 116 within data storage system 102. The host node 116 can forward the data to the data storage device 124 using the D-module 115, where the data storage device 124 comprises volumes 122. In this way, in this example, the client can access the storage volumes 122, to store and/or retrieve data, using the data storage system 102 connected by the network connection 112. Further, in this embodiment, the client 110 can exchange data with the N-module 117 in the host 118 within the data storage system 104 (e.g., which may be remote from the data storage system 102). The host 118 can forward the data to the data storage device 128 using the D-module 119, thereby accessing volumes 126 associated with the data storage device 128.

FIG. 2 is an illustrative example of a data storage system 200 (e.g., 102, 104 of FIG. 1), providing further detail of an embodiment of components that may implement the techniques and/or systems described herein. The example data storage system 200 comprises a host node 202 (e.g., nodes 116, 118 in FIG. 1), and a data storage device 204 (e.g., data storage devices 124, 128 in FIG. 1). The host 202 may be a general purpose computer, for example, or some other computing device particularly configured to operate as a storage server. A client 225 (e.g., 108, 110 in FIG. 1) can be connected to the host 202 over a network 215, for example, to provides access to files stored on the data storage device 204.

The data storage device 204 can comprise mass storage devices, such as disks 206, 208, 210 of a disk array 212, 214, 216. It will be appreciated that the techniques and systems, described herein, are not limited by the example embodiment. For example, disks 206, 208, 210 may comprise any type of mass storage devices, including but not limited to magnetic disk drives, flash memory, and any other similar media adapted to store information, including data (D) and/or parity (P) information.

The host 202 comprises a processor 218, a memory 220, a network adapter 222 and a storage adapter 224 interconnected by a system bus 226. The storage system 200 also includes an operating system 228 installed in the memory 220 of the host 202 that can, for example, implement a Redundant Array of Independent (or Inexpensive) Disks (RAID) optimization technique to optimize a reconstruction process of data of a failed disk in array.

The operating system 228 can also manage communications for the data storage system, and communications between other data storage systems that may be in a clustered network. Thus, the host 202 can to respond to client requests to manage data on the data storage device 204 (e.g., or additional clustered devices) in accordance with these client requests. The operating system 228 can often establish one or more file systems on the data storage system 204, where a file system includes software code and data structures that implement a persistent hierarchical namespace of files and directories, for example. As an example, when a new data storage device (not shown) is added to a clustered network system, the operating system 228 is informed where, in an existing directory tree, new files associated with the new data storage device are to be stored. This is often referred to as "mounting" a file system.

In the example data storage system 200, memory 220 can include storage locations that are addressable by the processor 218 and adapters 222, 224 for storing related software program code and data structures. The processor 218 and adapters 222, 224 may, for example, include processing elements and/or logic circuitry configured to execute the software code and manipulate the data structures. The operating system 228, portions of which are typically resident in memory 220 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files 236 to maintain relationships and replication schedules between a source volume and a destination volume (e.g., 130 and 132, respectively, in FIG. 1), for example, during data mirroring as discussed below.

The network adapter 222 includes the mechanical, electrical and signaling circuitry needed to connect the data storage system 200 to a client 225 over a computer network 215, which may comprise, among other things, a point-to-point connection or a shared medium, such as a local area network. The client 225 (e.g., 108, 110 of FIG. 1) may be a general-purpose computer configured to execute applications. As described above, the client 225 may interact with the data storage system 200 in accordance with a client/host model of information delivery.

The storage adapter 224 cooperates with the operating system 228 executing on the host 202 to access information requested by the client 225. The information may be stored on any type of attached array of writeable media such as magnetic disk drives, flash memory, and/or any other similar media adapted to store information. In the example data storage system 200, the information can be stored in data blocks on the disks 206, 208, 210. The storage adapter 224 includes input/output (I/O) interface circuitry 230 that couples to the disks over an I/O interconnect arrangement 232, such as a SAN protocol (e.g., SCSI, iSCSI, hyperSCSI, FCP). The information is retrieved by the storage adapter 224 and, if necessary, processed by the processor 218 (or the storage adapter 224 itself) prior to being forwarded over the system bus 226 to the network adapter 222, where the information is formatted into a data packet and returned to the client 225 over the network connection 215.

In one embodiment, storage of information on arrays 212, 214, 216 can be implemented as one or more storage "volumes" 234, 236 that are comprised of a cluster of disks 206, 208, or 210 defining an overall logical arrangement of disk space. The disks 206, 208, 210 that comprise one or more volumes are typically organized as one or more groups of RAIDs. As an example, volume 234 comprises an aggregate of disk arrays 212 and 214, which comprise the cluster of disks 206 and 208.

In one embodiment, to facilitate access to disks 206, 208, 210, the operating system 228 may implement a file system (e.g., write anywhere file system) that logically organizes the information as a hierarchical structure of directories and files on the disks. In this embodiment, respective files may be implemented as a set of disk blocks configured to store information, such as data (D) and/or parity (P), whereas the directory may be implemented as a specially formatted file in which other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume, which may also be referred to as a "traditional volume" in some contexts, corresponds to at least a portion of physical memory whose address, addressable space, location, etc. doesn't change, such as at least some of one or more data storage devices 204 (e.g., a RAID system). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical memory locations, such as some available space from each of the disks 206, 208, 210, for example. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238. Among other things, LUNS allow the disparate memory locations within which data is stored to be identified. As such, the LUNs 238, may be characterized as constituting a virtual disk upon which data within the virtual volume is stored within the aggregate.

In one embodiment, one or more data storage devices 204 can have one or more physical ports, wherein each physical port can be assigned a target address (e.g., SCSI target address). To represent each volume stored on a data storage device, a target address on the data storage device can be used to identify one or more LUNs 238. Thus, for example, when the host 202 connects to a volume 234, 236 through an I/O interface 230 on the storage adapter 224, a connection between the host 202 and the one or more LUNs 238 underlying the volume is created.

In one embodiment, respective target addresses can identify multiple LUNs, such that a target address can represent multiple volumes. The I/O interface 230, which can be implemented as circuitry and/or software in the storage adapter 224 (as illustrated) or as executable code residing in memory 220 and executed by the processor 218, for example, can connect to volume 234 by using one or more addresses that identify the LUNs 238.

In the example data storage system 200, the host 202 also comprises an offline/online controller 240, stored in memory 220, which can alter access permissions on a volume (e.g., volume 234) while the host remains connected with a LUN 238 in the volume. In this way, for example, the offline/online controller 240 can act as a layer of abstraction that is different than the I/O interface 230, such that the I/O interface can continuously keep a host connected to a volume via a LUN, while at the same time the offline/online controller 240 can either online the volume (making data in the volume accessible to a host or client) or offline the volume (blocking data in the volume from the host or client).

In one aspect, a user and/or administrator of a data storage and management system, such as illustrated by the exemplary environment 100 in FIG. 1 for example, may wish to strategically protect against data loss and/or data access that may be a result of one or more system failures (e.g., hardware failures, software failures, geographically isolated natural disasters, sabotage). In this aspect, in one embodiment, data mirroring techniques may be used to mitigate data loss and/or data access. In one embodiment of data mirroring, one or more volumes can act as a source volume and one or more volumes can act as a destination volume, wherein data at the source volume is replicated (e.g., full duplication, and/or merely a copy of metadata identifying the data) at the destination volume. In this embodiment, by periodically updating data from the source volume at the destination volume, the data at the destination volume can comprise the data from the source volume, merely at different locations (e.g., different geographic locations, and/or different server/storage devices).

For example, in FIG. 1, volume 130 (e.g., which is comprised in the one or more volumes 122 of a file system 120 that resides on data storage device 124 for the data storage system 102) is a source volume and volume 132 (e.g., which is comprised in the one or more volumes 126 of a file system 120 that resides on data storage device 128 for the data storage system 104) is a destination volume that replicates (or "backup") data for a client (e.g., first client 108). As an example, when the source volume 130 stores data for first client 108, the first client 108 accesses the source volume 130 through the source node 116 (e.g., source host). More particularly, in this example, when storing data in the source volume 130, the source host node 116 connects to the source volume 130, thereby allowing the client 108 to access data in the source volume 130. Further, when replicating the data in the source volume 130 to the destination volume 132, the source host 116 connects to the destination volume 132 over the cluster fabric 106, thereby allowing the source host 116 to access data in the destination volume 132 and replicate desired data (e.g., the data that an administrator or user wishes to replicate in case of failure) from the source volume 130.

Accordingly, in one embodiment, if a failure occurs in the source volume 130 (e.g., a hardware loss that renders data in the source volume unretrievable from the source volume), the first client 108 upon learning of the failure can request access to the mirrored data in the destination volume 132 by connecting through the destination host 118 over the cluster fabric 106 (e.g., utilizing the clustered network arrangement). However, in this embodiment, in order for the destination host 118 to provide the first client 108 with the mirrored data in the destination volume 132, the destination host 118 needs to connect to destination volume 132. Typically, utilizing current technology, this connection to the destination volume can take an undesirable amount of time, which can lead to relatively long data recovery times and commandeer computing resources that an administrator/user may wish to use for other work, for example.

The techniques and systems, described herein, can facilitate faster data recovery times, for example, when attempting to retrieve mirrored data after a data loss event (e.g., hardware and/or software failure, natural disaster, etc.). In one embodiment, as illustrated in the exemplary environment 100 of FIG. 1, the destination host node 118 connects to destination volume(s) 132 before a failure occurs at the source volume 130 (e.g., when the clustered storage system is brought online). By connecting to the destination volume 132 prior to a failure at the source volume 130, the techniques disclosed herein can mitigate an amount of time between the volume failure and retrieval of the mirrored data by the client 108, for example, in the event of a source volume failure.

In one embodiment, the destination host 118 can be "pre-connected" to one or more destination volumes, by having the source host 116 notify the destination host 118 (e.g., send a command or signal) prior to a failure at the source volume 130. This notification or "signal" informs (or commands) the destination host 118 to connect to the destination volume 132. In this way, for example, the destination host 118 is "pre-connected" to the destination volume 132, even though the destination host 118 may not ordinarily access data on the destination volume 132 unless commanded by the networked clients 108, 110, and/or after a failure of the source volume occurs. In one embodiment, this notification/signal may be transmitted to the destination host 118 from other components, such as from a client or another host node (not illustrated) of the clustered network 100.

In one embodiment, an administrator or user of the example data storage system 200 of FIG. 2 may provide inputs via the client 225, for example, appropriate for connecting a source host (e.g., 116 of FIG. 1) to both a source volume (e.g., 130 of FIG. 1) and destination volume (e.g., 132 of FIG. 1). In this embodiment, the source host can then automatically or at the administrator's/user's command, send a notification (e.g., signal or command) to a destination host (e.g., 118 of FIG. 1) instructing the destination host (e.g., 118 of FIG. 1) to also connect to the destination volume. For example, an administrator may input one or more commands into a command line interface that connect the source host to source and destination volumes, initiate a mirror update between the source and destination volumes, and send a signal to a destination host notifying the destination host to connect to the destination volume (e.g., prior to failure of the source volume). It will be appreciated that methods herein and/or portions thereof may be implemented as executable code maintained in memory 220 and executed on processor 218, for example.

One or more methods may be devised for managing data in a clustered network, for example, which can mitigate a time between mirrored data recovery. Embodiments of these methods are described with reference to FIGS. 3-4. While these methods are illustrated and described below as a series of acts or events, the present disclosure is not necessarily limited by the illustrated ordering of such acts or events. For example, some acts may occur in different orders and/or concurrently with other acts or events apart from those illustrated and/or described herein. In addition, not all illustrated acts may be required and other non-illustrated acts may be inserted. Further, one or more of the acts depicted herein may be carried out in one or more separate acts or phases.

Figure 3:
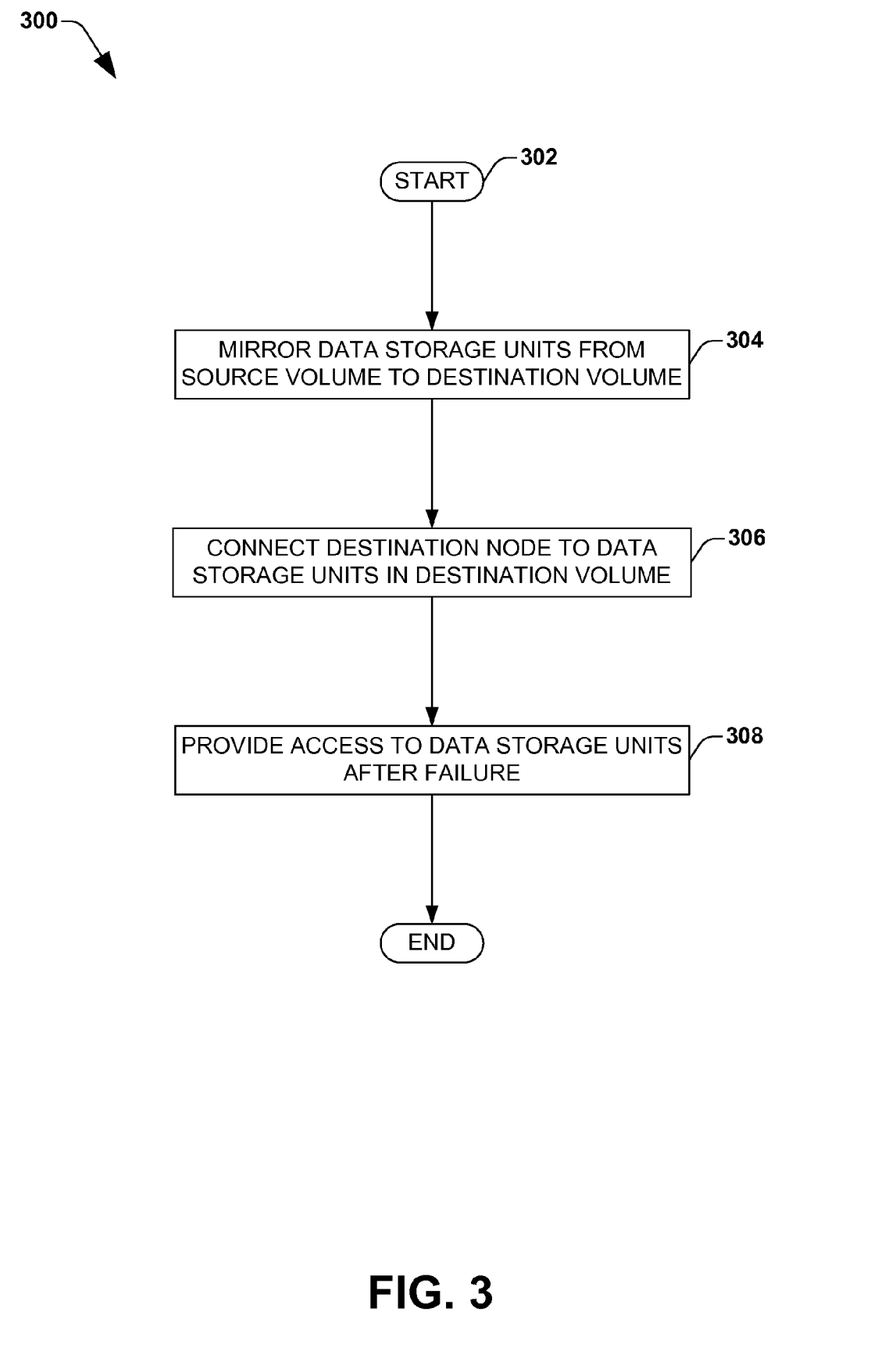
FIG. 3 is a flow chart of an example method for providing improved access time to mirrored data in a clustered network after a data access failure in accordance with one or more aspects of this disclosure.

FIG. 3 is a flow diagram of an example method 300 for providing access to mirrored data in a clustered network after a data access failure. The exemplary method 300 begins at 302 and involves mirroring (e.g., replicating) one or more data storage units (e.g., subsets of a storage volume) from a source volume (e.g., 130 of FIG. 1) to a destination volume (e.g., 132 of FIG. 1) in a clustered network (e.g., 100 of FIG. 1) to provide data backup, at 304. As described above, in one embodiment, data can be replicated from a first volume to a second volume, for example, where the volumes are (geographically) remote from each other, in order to create a backup (e.g., in case of data access loss). As an example, data can be replicated by copying the data from the first volume to the second volume, and can be mirrored by merely updating those portions of the data that have changed since a previous update.

At 306, the destination host node is connected to the one or more mirrored data storage units in a destination volume, those data storage units that were mirrored from the source volume, prior to a data access failure at the source volume. For example, as described above, the destination node can "pre-connect" to the data storage units that were mirrored from the source volume, thereby mitigating a need to connect to the respective data storage units after a data access failure, which, in-turn, can lessen a time for data retrieval after a data access failure.

At 308, access to the mirrored one or more data storage units can be provided (e.g., by bringing the data storage units online in the clustered network), so that other nodes in the cluster can access the mirrored data after the data access failure of the source volume. Providing access to the mirrored data can mitigate a need for the source node (e.g., using a client networked to the source node, such as client 108 to node 116 in FIG. 1) to connect to the respective mirrored data storage units after the failure.

In one embodiment, the data storage units can comprise a subset of a storage volume that is identified by a logical unit number (LUN). As described above, LUNs can identify disparate memory locations comprising data that is logically aggregated (e.g., belongs in a same data set, such as a data set appearing to be associated with a single database). As such, the LUNs can identify a virtual data storage unit within a volume (e.g., a subset of a virtual volume). Further, in one embodiment, the mirror can be reversed while the LUNs on the source node maintain a "pre-connection" with the destination node. That is, for example, while the connection is maintained, the source node can provide a mirror of the destination node, thereby allowing for mirroring of the destination node's LUNs in an event that renders the destination node data inaccessible.

Figure 4:
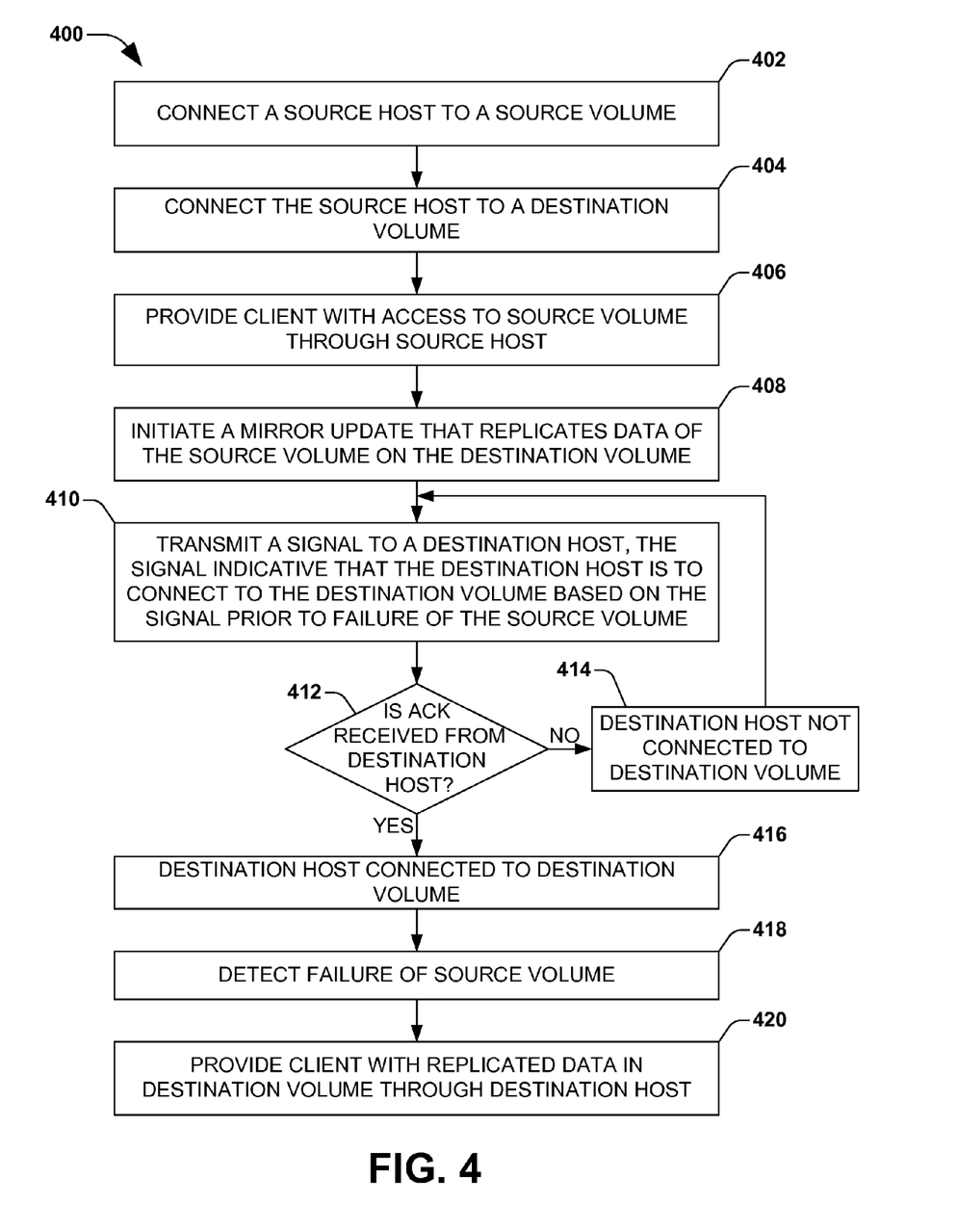
FIGS. 4-5 are flow charts that illustrate example embodiments for providing access to mirrored data in a clustered network after a data access failure in accordance with one or more aspects of this disclosure.

FIG. 4 is a flow diagram of an example embodiment 400 of a method for providing access to mirrored data, such as method 300 illustrated in FIG. 3, for example. The example embodiment 400 starts at 402 when a source host connects to a source volume, such as source node 116 connecting to source volume 130 in FIG. 1, for example. In some embodiments, the source volume resides on a first data storage device, such as data storage device 124 in FIG. 1.

At 404, the source host connects to a destination volume, such as destination volume 132 of FIG. 1. In some embodiments, the destination volume resides on a second data storage device, such as data storage device 128 in FIG. 1, which differs from the first data storage device. In one embodiment, the first data storage device can be remotely located (e.g., in different geographic location) from the second data storage device. In another embodiment, the first and second data storage devices may be located at a same location, but on different devices.

At 406, a client, which is coupled to the source host by a network connection, such as client 108 networked to node 116 in FIG. 1, is provided with access to the source volume through the source host. In this embodiment, the client can be used to store and/or make changes to data residing in the source volume.

At 408, a mirror update is initiated, which replicates data residing on the source volume to the destination volume. In one embodiment, merely source volume data selected by an administrator, user, or some automated system, for example, can be mirrored. In another embodiment, all of the data residing on the source volume can be mirrored. In this embodiment, the source volume and destination volume can store at least substantially the same data, or some form of data (e.g., metadata) that identifies the stored data. In one embodiment, although the client may be able to write data to the source volume at 408, typically the client does not have appropriate permissions to write to the destination volume at block 408. Rather, in this embodiment, the client may be locked out of writing to the destination volume to help facilitate accurate data mirroring during 408.

At 410, a signal (e.g., a command) is transmitted to a destination host, such as the destination node 118 in FIG. 1, in the clustered network. In one embodiment, the signal may be sent from the source data storage system (e.g., 102 in FIG. 1), for example, from the client networked to the source data storage system (e.g., from an administrator or automated program). In another example, the signal may be sent automatically by an operating system residing on the source node (e.g., 228 in FIG. 2) after the data on the volumes has been mirrored, and/or after an update to the mirrored data. In another embodiment, the signal may be sent from the destination data storage system (e.g., 104 in FIG. 1), for example, from the client networked to the destination data storage system. In another example, the signal may be sent automatically by the operating system residing on the destination node after the data on the volumes has been mirrored, and/or after an update to the mirrored data.

In this embodiment, the signal can command the destination host to connect to the destination volume prior to a failure of the source volume. While the signal may be transmitted from the source host or destination host, in other embodiments it can be transmitted from or another host in the clustered network, or a client connected to other host, or some other component. If multiple hosts are present in a clustered network, the signal can be transmitted to at least some (if not all) of the hosts, thereby allowing these hosts to "pre-connect" to respective destination volumes.

At 412, in the example embodiment 400 it is determined whether an acknowledgement (ACK) is received (e.g., at the source host) from the destination host to indicate that the destination host received the signal transmitted. For example, the operating system (or some other component) residing on the source node can determine if an ACK is received from the destination node. If an ACK is not received ("NO" at 412), such as after a pre-determined time, the source host presumes that the destination host is not connected to the destination volume and retransmits the signal at 414 (410). If the ACK is received ("YES" at 412), the exemplary embodiment 400 proceeds to 416 where is the source host presumes the destination host is connected to the destination volume, for example, and the data storage units (e.g., LUNs) residing thereon.

At 418, a data access failure (e.g., caused by hardware failure, software failure, disaster, etc.) is detected on the source volume, which renders the data in the source volume inaccessible to the source host and client. In one embodiment, failure may be detected when the data storage device on which the source volume resides does not respond to requests (e.g., from an attached client), as may occur, for example, when a natural disaster knocks out power to the data storage device. In another embodiment, failure may be detected if parity bits (e.g., stored on a parity disk (D) in FIG. 2) indicate an uncorrectable data error is present on a disk (e.g., 206) of the data storage device.

At 420, the client connects to the destination host, which provides the client with the mirrored (e.g., replicated) data in the destination volume. In another embodiment, the destination volume can "online" the mirrored LUNs (e.g., make the connection to the LUNs available) to the client. Because the replicated data in the destination volume is a mirrored version of the data in the source volume, for example, the client can retrieve the data in spite of the failure of the source volume. Further, because the destination host is "pre-connected" to the mirrored data, the client requesting the data, such as through the source host, can retrieve the data without having to wait for the destination host to connect to the respective data storage units that comprise the data.

Figure 5:
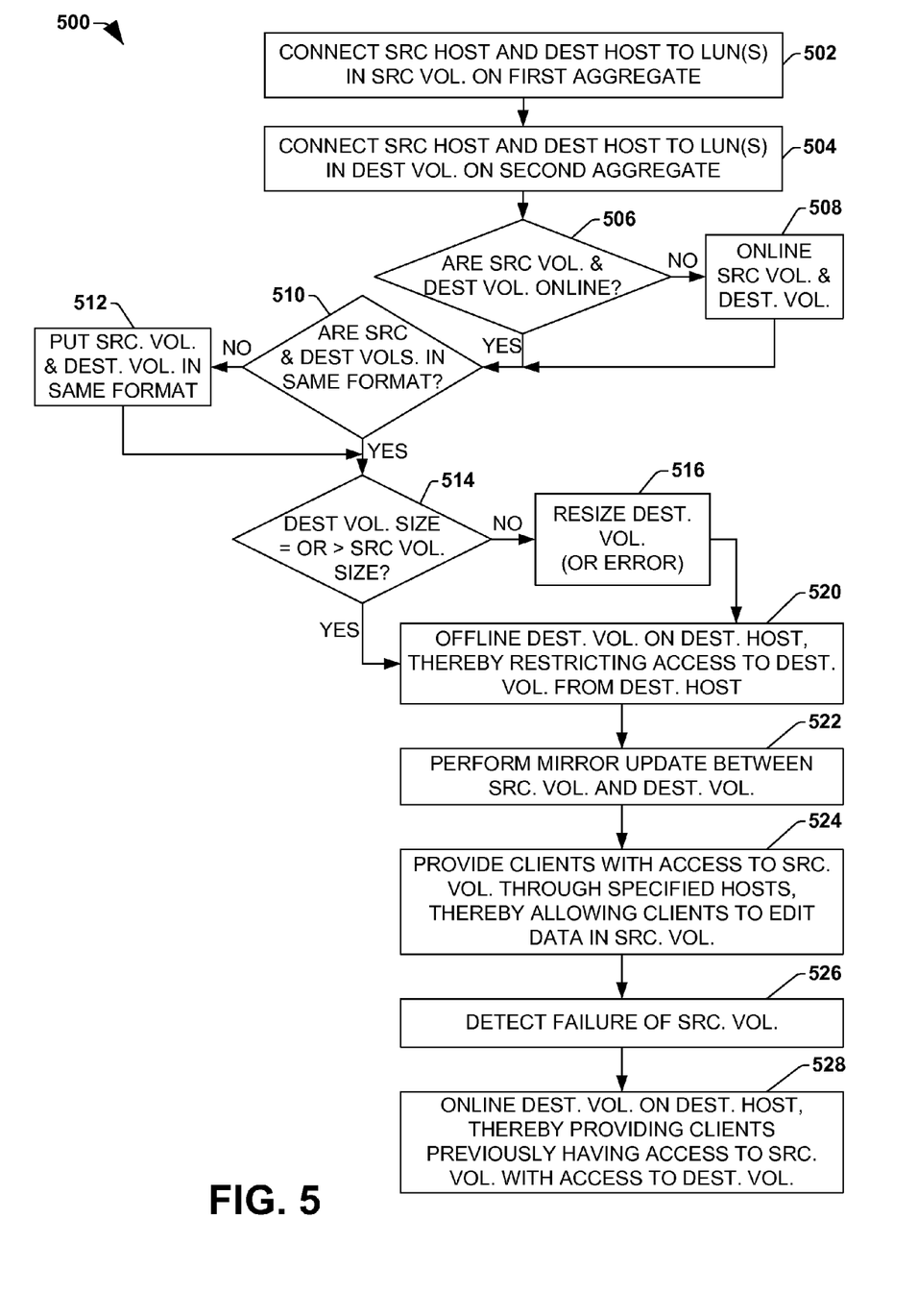

FIG. 5 is another exemplary embodiment 500 of providing access to mirrored data and begins at 502 when a source host and a destination host are both connected to one or more LUN(s) of a source volume. In one embodiment, the source volume can reside on a first aggregate of disks in a first data storage system (e.g., disks 206, 208 aggregated in vol. 1 234 of FIG. 2). In one embodiment, I/O interfaces (e.g., 230 in FIG. 2) residing on the respective source host and destination host can facilitate this connection, as described in FIG. 2 above.

At 504, the source host and the destination host are both connected to one or more LUN(s) of a destination volume. In one embodiment, the destination volume can reside on a second aggregate of disks in a second data storage system that is remotely located from the first data storage system. I/O interfaces (e.g., 230 in FIG. 2) residing on the respective source host and destination host can facilitate this connection.

At 506, it is determined (e.g., by the operating system or some other component residing on one or both of the source and destination nodes) whether the source volume and destination volume are online at the source host (e.g., available to devices, such as clients, networked to the clustered network). If the source volume and/or destination volume are not online ("No" at 506), an online/offline controller (e.g., 240 in FIG. 2) residing on the source host can bring the source volume and/or destination volume online at 508.

At 510, it is determined (e.g., by the operating system or some other component residing on one or both of the source and destination nodes) whether the source volume and destination volume are in the same data storage format (e.g., Unicode format). If not ("No" at 510), at 512 the source and destination volumes are put in the same format. In one example, the source host can translate (e.g., using the operating system or some other component residing on the source node) one (or both) of the volumes so they are in a same format. In one embodiment, if a format translation cannot be performed, an error can alternatively be flagged at 512. For example, in order for data to be mirrored between two volumes associated with different nodes in a clustered network, the volumes should share a same format so that data is stored in a same manner on the different volumes.

At 514, it is determined whether the destination volume is the same size or larger than the source volume. If not ("No" at 514), the destination volume can be resized (e.g., using the operating system or some other component residing on one or both of the source and destination nodes) at 516 (or alternatively an error can be flagged if, for example, there is insufficient memory to facilitate adequate resizing). For example, the destination volume needs to be able to store the data from the source volume, therefore, the destination volume should be at least of a same size (or larger) than the source volume.

At 520, the destination volume is brought offline for the destination host (e.g., using the operating system or some other component residing on one or both of the source and destination nodes). In this way, for example, although the destination host is still connected to the destination volume by the one or more LUNs (as described in 504 above), the destination host may not access data on the destination volume to make changes, additions, or deletions to the volume. As an example, prior to mirroring the source volume data to the destination volume, the destination volume has been set up (e.g., resized and formatted) to undergo the mirroring. Further, it would be undesirable (e.g., cause potential unrecoverable data errors) if the data were to be changed during the mirroring. Therefore, access to the volume (e.g., read-write access) is brought offline.

At 522, a mirror update is performed between the source volume and the destination volume. In one embodiment, the source and destination volume can exchange merely data that changed since a previous update (e.g., or since the last previous update, or some other previous version), such as changes to database values, thereby mitigating an amount of data (and therefore time) that is exchanged between the volumes. In this embodiment, after the mirror update, the source and destination volumes can comprise mirrored or replicated data (e.g., both volumes have at least the same data).

At 524 one or more clients are provided with access to the source volume. In one embodiment, one or more hosts (e.g., the source host, destination host, and other hosts in the clustered network) can be specified to have access to the source volume (e.g., using a cluster control operating system that may reside on one of the nodes, and/or be distributed throughout the clustered network). In this embodiment, the one or more clients can access the source volume through the specified hosts. In one embodiment, in order to access the source volume, the client(s) may undergo an authentication procedure (e.g., where a user or administrator enters a secure password). After authentication, in this embodiment, the clients can read and/or write data in the source volume. As described above, the clients may not be able to edit data in the destination volume while the mirror update is active in order to facilitate accurate data mirroring.

At 526, a failure of the source volume is detected. For example, a failure could be detected if the data storage device on which the source volume resides does not respond to requests, which may occur in a natural disaster that knocks out power to the data storage device (e.g., or a hardware, software, or some other failure occurs). Failure could also be detected if parity bits (e.g., stored on a parity disk (D) in FIG. 2) indicate an uncorrectable error is present on a disk (e.g., 206) of the data storage device.

At 528, in response to the detected failure, the destination volume is brought online on the destination host (e.g., automatically by a cluster control operating system that detects that failure). In one embodiment, because the "pre-connection" was made with the volume, for example, with the LUNs residing on the destination volume, the client(s) can access data on the destination volume through the destination host. In this embodiment, the LUNs are brought online through the destination host, thereby mitigating a need for other hosts (e.g., the source node) to connect to the respective LUNs on the destination volume. In this way, the time between data access failure and data access retrieval is mitigated, thereby reducing resource use. Further, because the replicated data in the destination volume is a mirrored version of the data in the source volume, the client can retrieve the data accurately regardless of the failure of the source volume.

It will be appreciated that processes, architectures and/or procedures described herein can be implemented in hardware, firmware and/or software. It will also be appreciated that the provisions set forth herein may apply to any type of special-purpose computer (e.g., file host, filer and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include hard drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data. Computer readable media may also comprise communication media, which typically embodies computer readable instructions or other data in a modulated data signal such as a carrier wave or other transport mechanism (e.g., that has one or more of its characteristics set or changed in such a manner as to encode information in the signal). The computer readable medium can also be distributed (e.g., using a switching fabric, such as used in computer farms) over a network-coupled computer system so that computer readable code is stored and executed in a distributed fashion.

Figure 6:
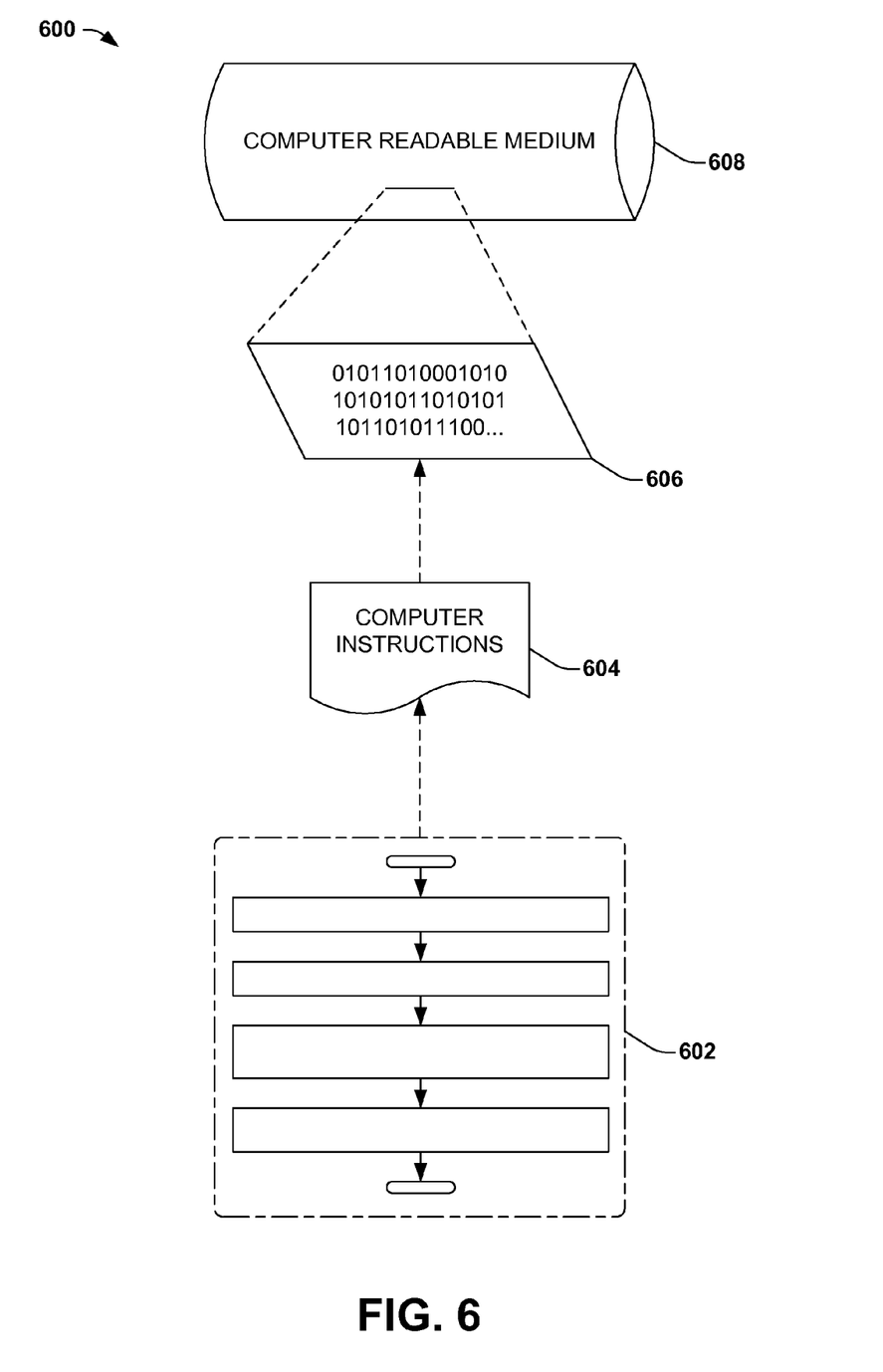
FIG. 6 is an example of a computer readable medium in accordance with one or more aspects of this disclosure.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 6, where the implementation 600 comprises a computer-readable medium 608 (e.g., a CD-R, DVD-R, or a platter of a hard disk drive), on which is encoded computer-readable data 606. This computer-readable data 606 in turn comprises a set of computer instructions 604 configured to operate according to the principles set forth herein. In one such embodiment, the processor-executable instructions 604 may be configured to perform a method 602, such as the method 300 of FIG. 3 or method 500 of FIG. 5, for example. Many such computer-readable media may be devised by those of ordinary skill in the art that are configured to operate in accordance with the techniques presented herein.

Moreover, unless specified to the contrary, the term "or" is intended to mean an inclusive "or" rather than an exclusive "or", and the articles "a" and "an" are generally to be construed to comprise "one or more". Furthermore, to the extent that the terms "includes", "having", "has", "with", or variants thereof are used, such terms are intended to be inclusive in a manner similar to the term "comprising".

What is claimed is:

1. A method of data management, comprising:
    using a source logical unit number (LUN) to connect a source host to a source volume;
    using a destination LUN to connect the source host to a destination volume;
    initiating a mirror update that replicates source data blocks on the source volume as replicated data blocks on the destination volume; and
    prior to detecting a failure on the source volume;
        connecting a destination host to the destination volume using the destination LUN; and
        off-lining the destination volume at the destination host.

2. The method of claim 1, comprising:
    after detecting the failure, on-lining the destination volume at the destination host.

3. The method of claim 2, the on-lining comprising:
    providing a client with read-write access to the replicated data blocks on the destination volume through the destination host.

4. The method of claim 1, the off-lining the destination volume comprising:
    restricting read-write access to the destination volume through the destination host.

5. The method of claim 1, comprising:
    prior to detecting the failure, providing a client with access to the source data blocks on the source volume through the source host.

6. The method of claim 1, the failure on the source volume rendering the source volume inaccessible to a client.

7. A host configured to communicate with a data storage system, comprising:
    an Input/Output (I/O) interface configured to, based on a signal received at the host prior to failure of a source volume, selectively establish a connection with a destination volume using a logical unit number (LUN); and
    an offline/online volume controller configured to, while the connection is established, selectively online the destination volume to provide access to data in the destination volume to a client, and configured to selectively offline the destination volume to block access to data in the destination volume from the client.

8. A non-transitory computer readable medium comprising computer executable instructions that when executed by a processor implement a method comprising:
    connecting a source host to a source volume using a source logical unit number (LUN);
    connecting the source host to a destination volume using a destination LUN;
    initiating a mirror update that replicates data of the source volume on the destination volume; and
    transmitting a signal to a destination host, the signal indicative that the destination host is to connect to the destination volume using the destination LUN prior to a failure of the source volume.

9. A method for providing access to mirrored data after a data access failure, comprising:
    mirroring data from a source volume to a destination volume, the source volume accessible to a client through a source host;
    connecting a destination host to the destination volume prior to a data access failure at the source volume, the client restricted from accessing the destination volume through the destination host prior to the data access failure; and
    providing the client with access to the destination volume through the destination host after the data access failure.

10. The method of claim 9, the source volume residing on a first data storage device and the destination volume residing on a second data storage device different from the first data storage device.

11. The method of claim 9, the mirroring comprising:
    mirroring a subset of data on the source volume, the subset identified by a logical unit number (LUN).

12. The method of claim 9, the source host and the destination host geographically remote from one another but coupled to one another via a network connection.

13. The method of claim 9, the data access failure corresponding to a failure of the source host, the data access failure rendering the source volume inaccessible to the client through the source host.

14. The method of claim 9, the data access failure corresponding to a failure of the source volume, the data access failure rendering the source volume inaccessible to the client.

15. The method of claim 9, comprising:
    prior to the data access failure at the source volume, off-lining the destination volume while the destination host is connected to the destination volume.

16. The method of claim 15, the off-lining the destination volume comprising:
    restricting read-write access to the destination volume through the destination host.

17. The method of claim 15, comprising:

after the data access failure at the source volume, on-lining the destination volume.

18. The method of claim 17, the on-lining comprising:

on-lining the destination volume while the destination host is connected to a logical unit number (LUN) in the destination volume.

19. The method of claim 17, the on-lining the destination volume comprising:

permitting read-write access to the destination volume through the destination host.

20. The method of claim 9, the destination host connected to a logical unit number (LUN) in the destination volume.

* * * * *